US012686593B2

(12) United States Patent
Rose et al.

(10) Patent No.: US 12,686,593 B2
(45) Date of Patent: Jul. 21, 2026

(54) ELEVATOR PIT SAFETY SYSTEM AND METHODS OF USE THEREOF

(71) Applicant: Electronic Controls Inc., Cape Canaveral, FL (US)

(72) Inventors: Michael Rose, Orange City, FL (US); Walter Heidt Barnes, Merritt Island, FL (US)

(73) Assignee: Electronic Controls Inc., Cape Canaveral, FL (US)

( * ) Notice: Subject to any disclaimer, the term of this patent is extended or adjusted under 35 U.S.C. 154(b) by 1254 days.

(21) Appl. No.: 17/550,649

(22) Filed: Dec. 14, 2021

(65) Prior Publication Data

US 2022/0185626 A1 Jun. 16, 2022

Related U.S. Application Data

(60) Provisional application No. 63/125,460, filed on Dec. 15, 2020.

(51) Int. Cl.
*B66B 5/00* (2006.01)
*B66B 3/00* (2006.01)

(52) U.S. Cl.
CPC ............ *B66B 5/0068* (2013.01); *B66B 3/002* (2013.01)

(58) Field of Classification Search
CPC .............................. B66B 5/0068; B66B 3/002
USPC .......................................................... 187/390
See application file for complete search history.

(56) References Cited

U.S. PATENT DOCUMENTS

| | | | | |
|---|---|---|---|---|
| 4,367,810 | A * | 1/1983 | Doane | B66B 13/18 187/280 |
| 4,898,263 | A * | 2/1990 | Manske | B66B 5/0087 187/247 |
| 2010/0155184 | A1* | 6/2010 | Sirigu | B66B 5/0087 187/314 |
| 2016/0214834 | A1 | 7/2016 | Cunningham et al. | |
| 2022/0024716 | A1* | 1/2022 | Hosemann | B66B 1/3446 |
| 2024/0286869 | A1* | 8/2024 | Talonen | B66B 5/0031 |

OTHER PUBLICATIONS

Force Guided Relay SR4 D/M, TE Connectivity Relay Products, 2012, pp. 1-3.
Safety, Normally Closed Contact and Contact Holder PCW010SS-CH, Automation Systems Interconnect, Inc., pp. 1-2.
Predesigned Pendant Control Stattion for Otis Elevator, Product Data Sheet, Schneider Electric, pp. 1-2.

* cited by examiner

*Primary Examiner* — Erick D Glass
(74) *Attorney, Agent, or Firm* — Bradley Arant Boult Cummings LLP

(57) ABSTRACT

An elevator pit safety system is provided, along with methods of use thereof. An elevator pit safety system may include a control system, an emergency stop switch, and a power switch. The emergency stop switch may be configured to stop an elevator cab. The power switch may be configured to operate a lighting system. The control system may prevent either from being used without the other. The elevator pit safety system may be configured to allow overriding the safety features.

15 Claims, 10 Drawing Sheets

400

200 300

| Emergency Stop Switch Input State | Power Switch Input State | Lighting System Output State | Stopping Component Output State |
|---|---|---|---|
| Closed | Open or Closed | On | On |
| Open or Closed | Closed | On | On |

220 230 350 360

FIG. 3A

400

200 300

| First Override Button Input State | Second Override Button Input State | Lighting System Output State | Stopping Component Output State |
|---|---|---|---|
| Open | Open | On | On |
| Open | Closed | On | On |
| Closed | Open | On | On |
| Closed | Closed | On | Off |

240 241 350 360

FIG. 3B

400

200 300

| First Override Button Input State | Second Override Button Input State | First Indicator Light Output State | Second Indicator Light Output State | Beeper Output State |
|---|---|---|---|---|
| Open | Open | Off | Off | Off |
| Open | Closed | Off | Off | Off |
| Closed | Open | Off | Off | Off |
| Closed | Closed | On | On | On |

240 241 342 343 344

FIG. 3C

ELEVATOR PIT SAFETY SYSTEM AND METHODS OF USE THEREOF

CROSS-REFERENCE TO RELATED APPLICATIONS

This application claims priority to U.S. Provisional Patent Application Ser. No. 63/125,460, titled ELEVATOR PIT SAFETY SYSTEM AND METHODS OF USE THEREOF and filed on Dec. 15, 2020; the specification, drawings, and claims thereof and the appendix thereto are incorporated herein by reference in their entirety.

FIELD OF INVENTION

This disclosure relates generally to elevator electronics, in particular, methods and systems for safety controls of elevators. Uses for this apparatus may include, but are not limited to, preventing dangerous motion of an elevator cab while a person works in the pit beneath the cab; allowing motion of the cab while a person works in the pit—which would otherwise be dangerous—to be conducted safely; and controlling the motion of an elevator cab to be either allowed or disallowed based either on the state of a switch for lighting, on the state of a stop switch, on the state of one or more override buttons, or some combination of the foregoing.

BACKGROUND

An elevator cab is a vehicle for vertical motion within an elevator shaft. The volume of elevator shaft beneath the elevator cab is known as the "pit." People—for example, mechanics, technicians, inspectors, operators, and maintenance personnel—sometimes must access and enter the pit. Entry to the pit may be necessary for a variety of reasons, including repair, maintenance, flood mitigation, and retrieval of items accidentally dropped by passengers into the pit (for example, keys or phones that have fallen through the space between the cab and the hoistway door). Every year, people who have entered the pit are crushed by elevator cabs that have unexpectedly descended into the pit.

A 2013 report from CPWR—The Center for Construction Research and Training reported that, in the years 1992-2009, two hundred sixty-three people died, related to work on or near elevators. That includes forty-six deaths involving such activities as retrieving keys and other objects that had dropped into a shaft, cleaning inside an elevator shaft or elevator, fixing stuck elevators, or otherwise working in elevator shafts or cars. Among those killed were elevator constructors, janitors, cleaners, building managers, building supervisors, and elevator inspectors.

Some known systems are designed to help prevent death and injury in the pit. For example, some elevators are equipped with switches for disabling the operation and motion of the elevator cab. But, those systems are susceptible to user error or poor decision-making. In particular, if no one remembers to disable the cab, the known systems are ineffective. Some people who enter are not experienced with elevator maintenance, or they lack training in such; so they do not recognize the dangers and do not know to take proper precautions. Worse, the known systems allow a person to recklessly choose to not disable the cab—as when, for example, they expect to be in the pit for only a short time. Thus, the known systems are ineffective when a person either chooses to not use them or simply forgets.

However, when a person enters the pit, he or she is unlikely either to forget to turn on the light or to choose to work in the dark. In fact, since the pit of an elevator shaft is often a dark void, pits usually contain lighting systems for illuminating the pit so that anyone who enters is able to see clearly. Such elevator pit lighting systems may be controlled by a switch for turning on only when needed.

In its Safety Code for Elevators and Escalators (ASME A17.1-2019) (hereinafter, the "Elevator Code"), the American Society of Mechanical Engineers requires that pits have both emergency-stop switches and lighting. However, these safety devices work independently of each other. Because entry to the pit is so routine, sometimes the lights are turned on—for example to find the items to be retrieved or to perform maintenance—without activating the emergency-stop switch that prevents the car from moving and crushing personnel in the pit. And, sometimes a person in the pit needs to adjust the height of the cab above the pit floor without adjusting the lights.

Thus, there is a need in the art for improved systems and methods that overcome the challenges of human negligence or recklessness with respect to the known systems for pit safety. The present disclosure describes such systems and methods, for example by leveraging actions that entrants are unlikely to forget or otherwise make a decision to forego. The present disclosure also describes systems and methods for temporarily circumventing a safety system.

SUMMARY OF THE INVENTION

The present disclosure describes an elevator pit safety system and methods of use thereof. In one embodiment, an elevator pit safety system is disclosed, including: a control system; an emergency stop switch connected to the control system; a power switch connected to the control system; and one or more override buttons connected to the control system.

In another embodiment, an elevator pit safety system is disclosed, including: a power switch connected both to a control system and to a lighting system; an emergency stop switch connected to the control system; a stopping component connected to the control system; and one or more override buttons connected to the control system.

In another embodiment, a method of using an elevator pit safety system is disclosed, including: activating either an emergency stop switch or a power switch, each configured to both activate a stopping component and activate a lighting system; entering an elevator pit; exiting the elevator pit; and deactivating both the emergency stop switch and the power switch.

BRIEF DESCRIPTION OF THE DRAWINGS

The following drawings are attached to—and form a portion of—this disclosure:

FIG. 3A is a chart depicting an output rule of an embodiment of an elevator pit safety system.

FIG. 3B is a chart depicting an output rule of an embodiment of an elevator pit safety system.

FIG. 3C is a chart depicting an output rule of an embodiment of an elevator pit safety system.

DEFINITIONS

Figure 1:
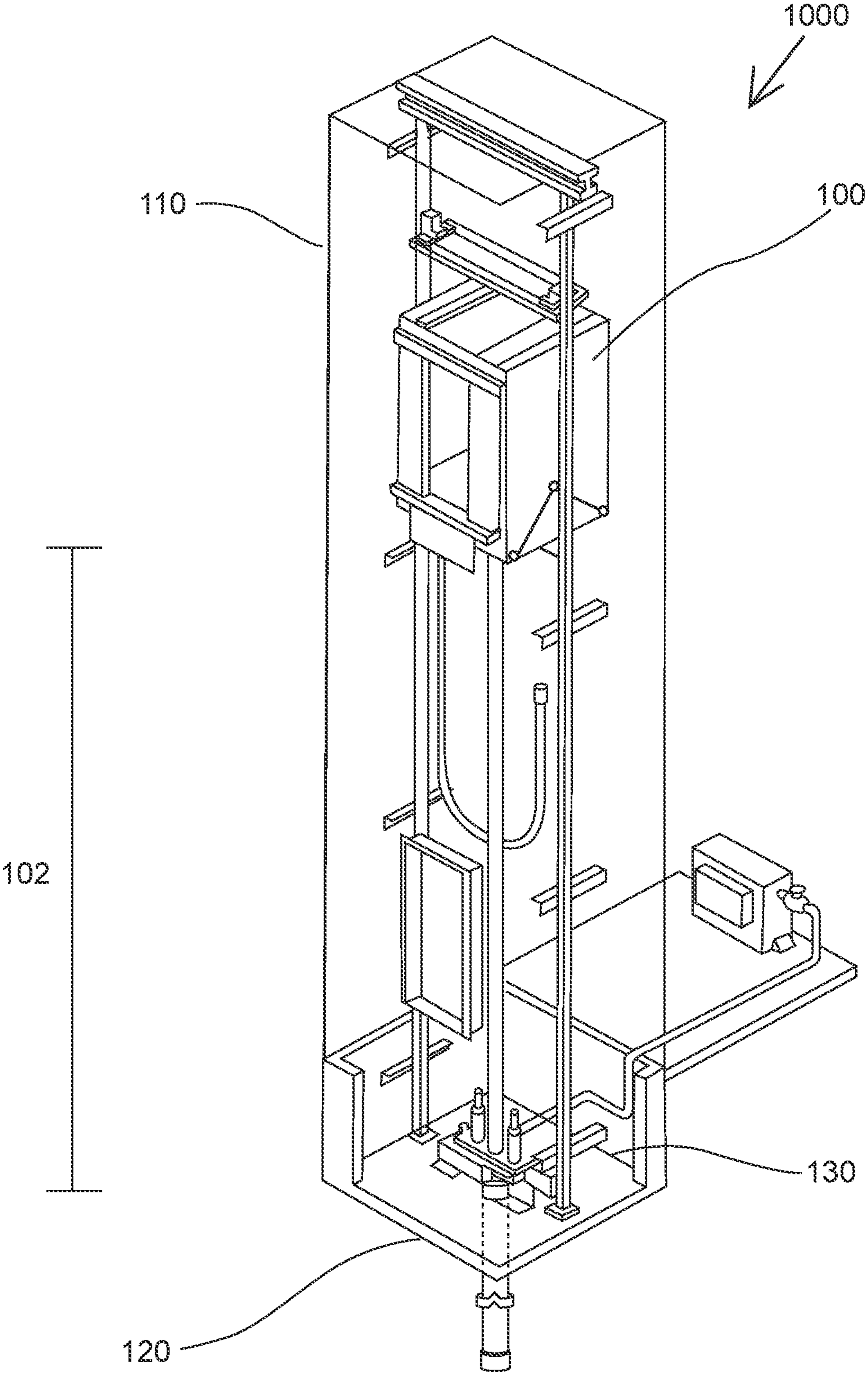
FIG. 1 is a view of an elevator system.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The terms "connected to," "in connection with," "in communication with," or "connecting" one or more other parts refer to any suitable connection or communication, including mechanical connection, electrical connection (e.g., one or more wires), or signal-conducting channel (e.g., Bluetooth®, Near-Field Communication (NFC), or other inductive coupling or radio-frequency (RF) link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

The term "memory" may refer to a tangible or non-transitory storage medium. Examples of tangible (or non-transitory) storage media include disks, thumb drives, and memory, etc., but do not include propagated signals. Tangible computer readable storage media include volatile and non-volatile, removable and non-removable media, such as computer readable instructions, data structures, program modules, or other data. Examples of such media include RAM, ROM, EPROM, EEPROM, SRAM, flash memory, disks or optical storage, magnetic storage, or any other non-transitory medium that stores information that is accessed by a processor or computing device.

It is to be understood that any given elements of the disclosed embodiments of the invention may be embodied in a single structure, a single step, or the like. Similarly, a given element of the disclosed embodiment may be embodied in multiple structures, steps, or the like.

The following description illustrates and describes the processes, machines, manufactures, and other teachings of the present disclosure. The disclosure shows and describes only certain embodiments of the processes, machines, manufactures, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, and other teachings of the disclosure and to enable others skilled in the art to utilize the teachings of the disclosure in such, or other, embodiments and with the various modifications required by the particular applications or uses. Accordingly, the processes, machines, manufactures, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

As described in more detail below, an elevator pit safety system and a method for using an elevator pit safety system have been developed by the inventors. In addition to the description herein and in the accompanying drawings, further detail is contained in U.S. Provisional Patent Application Ser. No. 63/125,460, titled ELEVATOR PIT SAFETY SYSTEM AND METHODS OF USE THEREOF and filed on Dec. 15, 2020; the specification, drawings, and claims thereof and the appendix thereto are incorporated herein by reference in their entirety. While embodiments of the elevator pit safety system and methods for using an elevator pit safety system for use with elevators are generally discussed and illustrated, variations could be advantageously used in many types of environments or vehicles. In other words, the teachings of this disclosure may be advantageous in other classes of transport, including other modes of cable transportation and modes of rail transportation.

1. System

FIG. 1 shows an elevator system 1000 having a cab 100 in a shaft 110. The cab 100 is above a floor 120 at a height 102. Between the cab 100 and a floor 120 is a pit 130. In an elevator system 1000, the pit 130 may be a substantially open volume, which may optionally contain operating equipment, operating controls, lighting, switches, or other mechanical or electrical hardware (not specifically shown in FIG. 1) useful for the operation, maintenance, or safety of the elevator system 1000.

Figure 2A:
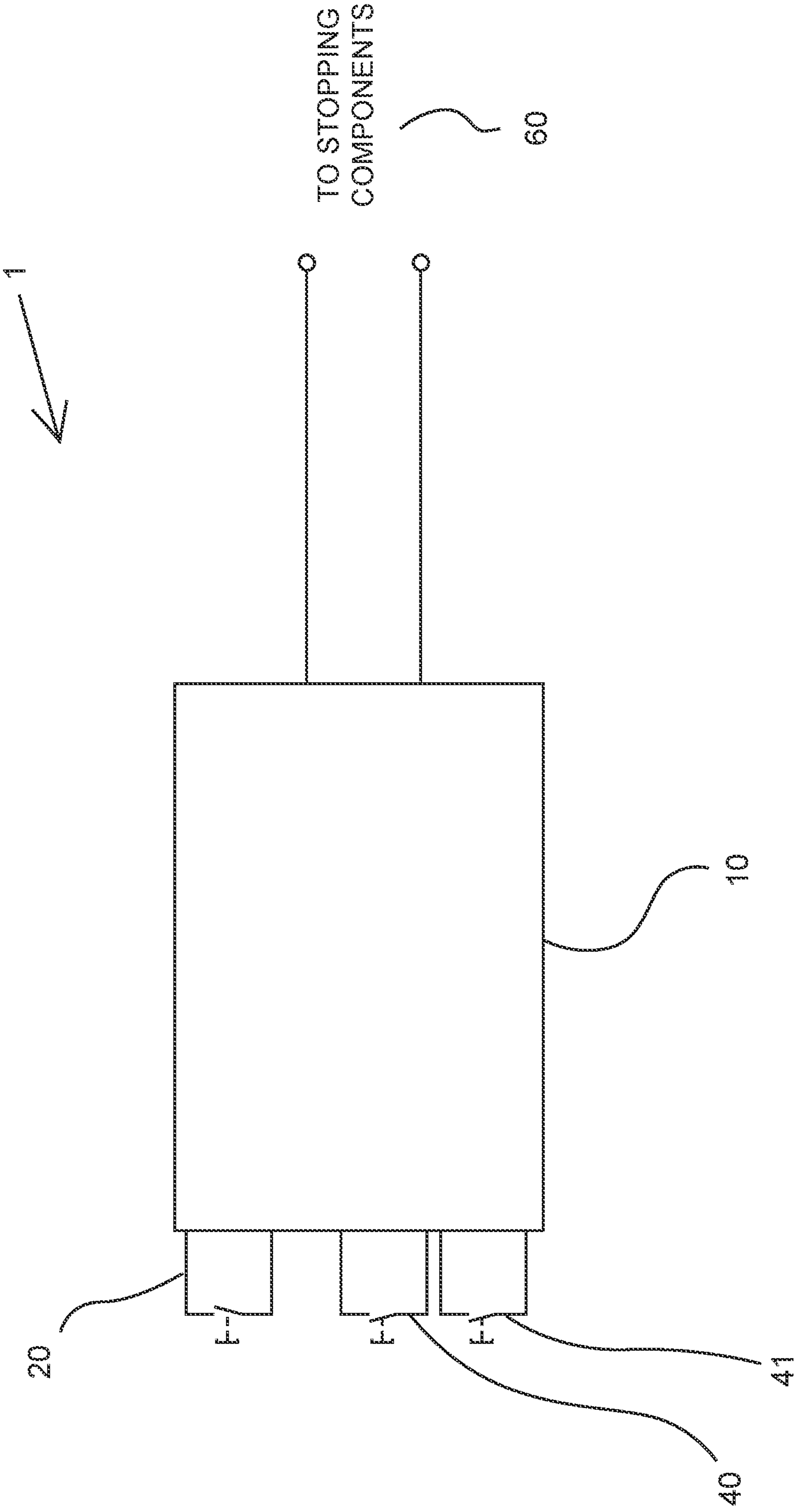
FIG. 2A is a schematic view of a control electrical circuit of an embodiment of an elevator pit safety system.

FIG. 2A shows a schematic view of an embodiment of an elevator pit safety system 1 in accordance with the present invention. The elevator pit safety system 1 may include a control system 10, an emergency stop switch 20, and one or more override buttons 40, 41. The elevator pit safety system 1 may include or connect to a stopping component 60. These and other components of an elevator pit safety system 1 are described in further detail below. The elevator pit safety system 1 is not limited to the components discussed above and shown in FIG. 2A. In particular, additional details, features, and elements of the elevator pit safety system 1 are shown in FIGS. 1-4.

1.1 Control System

Figure 2B:
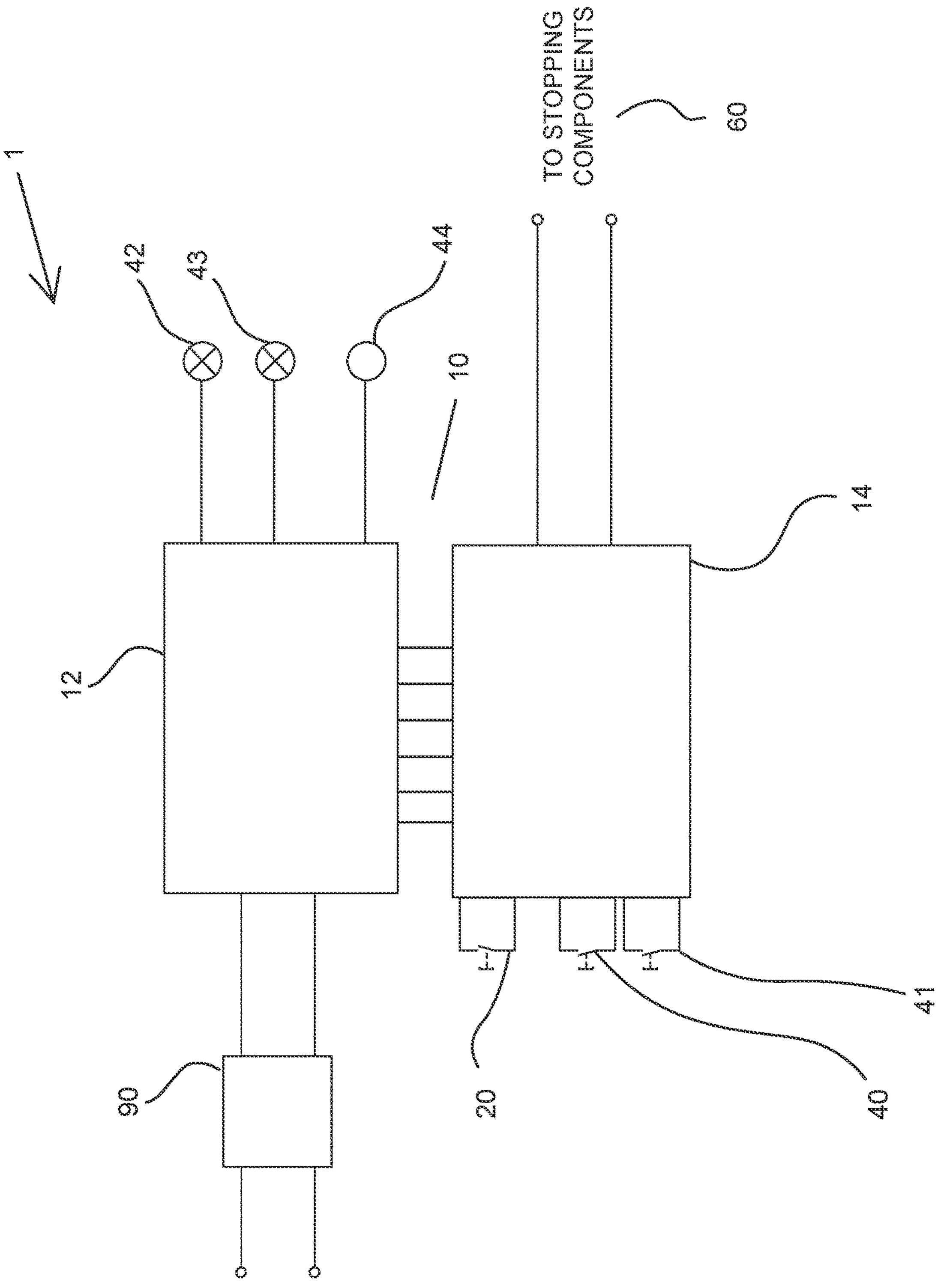
FIG. 2B is a schematic view of a control electrical circuit of an embodiment of an elevator pit safety system.

As shown in FIG. 2B, the control system 10 may, in some embodiments, include a control—logic component 12 and a fail-safe-logic component 14. The control system 10, and any component thereof—for example a control-logic component 12 or a fail-safe-logic component 14—may include one or more processors. In some embodiments, the control system 10, and any component thereof—for example a control-logic component 12 or a fail-safe-logic component 14—may include one or more switches, each of which may be any suitable switch such as a mechanical switch or electrical switch (e.g., a relay, a solid-state relay, a set of electrical terminals, or any other electrical switch).

1.2 Stopping Component

The control system 10—or any component thereof, for instance a fail-safe-logic component 14—may be connected to a stopping component 60. A stopping component 60 may be any means for substantially stopping the motion or operation of the cab 100 or for substantially preventing the motion or operation of the cab 100. For example, a stopping component 60 may be a safety string, a safety brake, a governor, or any other suitable stopping component.

In one embodiment, the stopping component 60 is a safety string. In this aspect, the safety string may be an electrical circuit with one or more switches. The switches of the safety string may be connected in series, in which case any particular switch may function as a "kill switch." That is, if any normally closed switch of the safety string is in an open position, then the cab 100 may be substantially prevented from moving or operating. For example, the safety string may comprise the normally closed switches associated with an inside car stop 62 and a car top stop 64 (shown in FIG. 2D, discussed below).

In another embodiment, the stopping component 60 is a safety brake. In this aspect, the safety brake may be a mechanical or electrical brake for substantially preventing the motion or operation of the cab 100.

In yet another embodiment, the stopping component 60 is a governor. In this aspect, the governor may be any device suitable for substantially preventing the motion or operation of the cab.

Other possible embodiments of the stopping component 60—including safety strings, safety brakes, and governors—are described in U.S. Patent Application Publication Number 2016/0214834, titled ELEVATOR SAFETY DEVICE and published on Jul. 28, 2016, the disclosures of which are incorporated herein by reference in their entirety.

1.3 Override Buttons and Indicator Lights

In some embodiments, one or more override buttons 40, 41 are connected to the control system 10, for example to a fail-safe-logic component 14. In some embodiments, the one or more override buttons 40, 41 may be push-buttons or any other suitable button.

FIG. 2B shows that in some embodiments, one or more indicator lights 42, 43 are connected to the control system 10, for example to a control-logic component 12. In some embodiments, the one or more indicator lights 42, 43 may be connected to one or more of the one or more override buttons 40, 41. In some embodiments, the one or more indicator lights 42, 43 may be proximate to, adjacent to, or integral to one or more of the one or more override buttons 40, 41. One or more indicator lights 42, 43 may include any suitable visual indicator, such as an LED, a plurality of LEDs, an LED strip, one or more incandescent lights, or one or more fluorescent lights. In one embodiment, the indicator lights 42, 43 each include one or more LEDs. In one embodiment, the indicator lights 42, 43 each include an LED strip. In one embodiment, the indicator lights 42, 43 each include one or more incandescent lights. In one embodiment, the indicator lights 42, 43 each include one or more fluorescent lights.

Additionally, in some embodiments, at least one beeper 44 may be connected to the control system 10. In one embodiment, the at least one beeper 44 is connected to the control-logic component 12. A beeper 44 may be any suitable sound-generating device, such as a chime, a beeper (e.g., a piezo beeper), a buzzer, a bell, or any other sound-generating device. In one embodiment, a beeper 44 may be a chime. In one embodiment, a beeper 44 may be a piezo beeper. In one embodiment, a beeper 44 may be a buzzer. In one embodiment, a beeper 44 may be a bell. In one embodiment, a beeper 44 may be located in the pit 130. In one embodiment, a beeper 44 may be located outside the pit 130, e.g., in a safety office (not specifically shown). In one embodiment, a beeper 44 may be located in the pit 130 and another beeper 44 may be located outside the pit 130, e.g., in a safety office (not specifically shown).

1.4 Power System

In some embodiments, the elevator safety system 1 may include a power system 90. In other embodiments, the elevator safety system 1 may have no power system 90 but instead connect to a system for power in the environment of use.

Figure 2C:
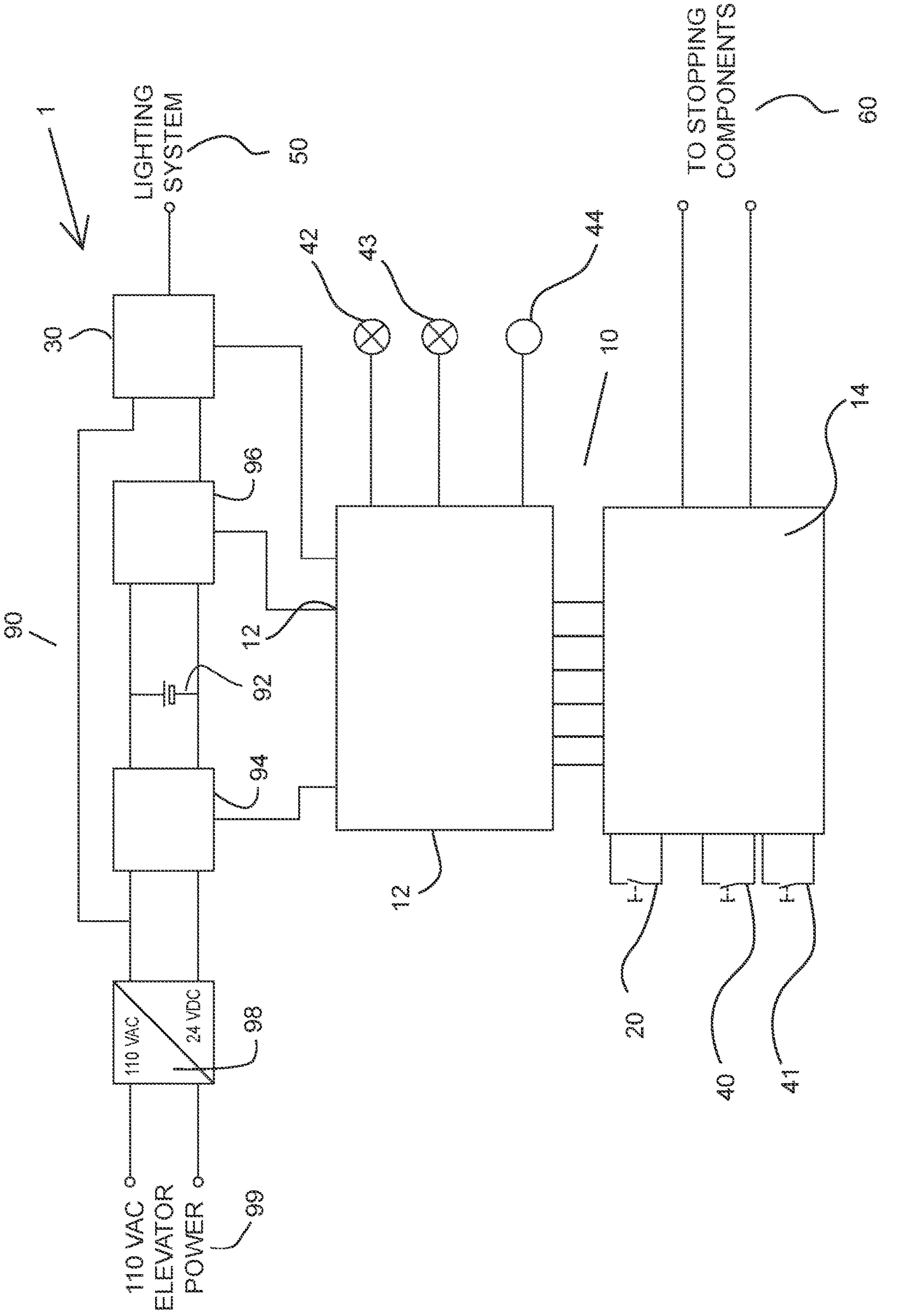
FIG. 2C is a schematic view of a control electrical circuit of an embodiment of an elevator pit safety system.

FIG. 2C shows that a power system 90 may include a battery 92 (e.g., a 12-volt battery) connected to a battery charger 94. (The battery charger may be configured to keep the battery 92 charged.) A power system 90 may also include a boost converter 96.

A power system 90 may also include a power supply 98 (e.g., a 110-volt-AC-to-24-volt-DC power supply). The power system 90 may be configured to provide power to the control system 10, or to any component of the control system 10. In some embodiments, the power system 90 may connect (for example via a ground-fault circuit-interrupter (GFCI)) to a supply of power to the elevator system 1000 (for example a 110-volt AC power supply 99) or to another supply of power in the environment of use.

In some embodiments the elevator safety system 1 may be configured to operate even when power fails. In some embodiments, the power system 90 may be configured to operate even if the power supply 98 (or an environmental supply of power) fails. For example, in some embodiments, if the power supply 98 (or an environmental supply of power) fails, then the control system 10 may be configured to activate the boost converter 96. In such embodiments, the boost converter 96 may be configured to then create power from the battery 92. In some such embodiments, the boost converter 96 may be configured to provide the power to the lighting system 50 (described below more fully), for instance, when the emergency stop switch 20 is activated. In some embodiments, the boost converter 96 may be configured to create 24-volt-DC power from a 12-volt battery 92.

1.5 Power Switch and Lighting System

A power switch 30 may be connected to the control system 10. In one embodiment, as shown in FIG. 2C, the power switch 30 is connected to a control-logic component 12. The power switch 30 also may be connected to a power system 90 (for example, as shown in FIG. 2A, to a boost converter 96). The power switch also may be connected to a lighting system 50. A lighting system 50 may be any suitable lighting system and may be configured to illuminate at least a portion of: the pit 130, the floor 120, or both. For example, a lighting system 50 may include an LED, a plurality of LEDs, an LED strip, one or more incandescent lights, or one or more fluorescent lights. An example component of a lighting system 50 is the CABLITE® linear LED strip available from ECI America, Inc. In one embodiment, the lighting system 50 includes one or more LEDs. In one embodiment, the lighting system 50 includes an LED strip, for example a damage-resistant LED linear strip. Some embodiments of the lighting system 50 may support up to approximately 8 feet of LED linear strips; other embodiments may support more LED linear strips, and other embodiments may support less LED linear strips. In one embodiment, the lighting system 50 includes one or more incandescent lights. In one embodiment, the lighting system 50 includes one or more fluorescent lights. The lighting system 50 may be configured to provide at least a minimum light intensity required by a safety code, for example a light intensity of more than approximately 50 foot-candles as required by the Elevator Code. The lighting system 50 may be configured to provide battery-powered backup lighting for emergency egress from the pit 130, for example in the case of a power failure that occurs while a person is working in the pit 130.

1.6 Pit Emergency Stop Switch; Entry Emergency Stop Switch

Figure 2D:
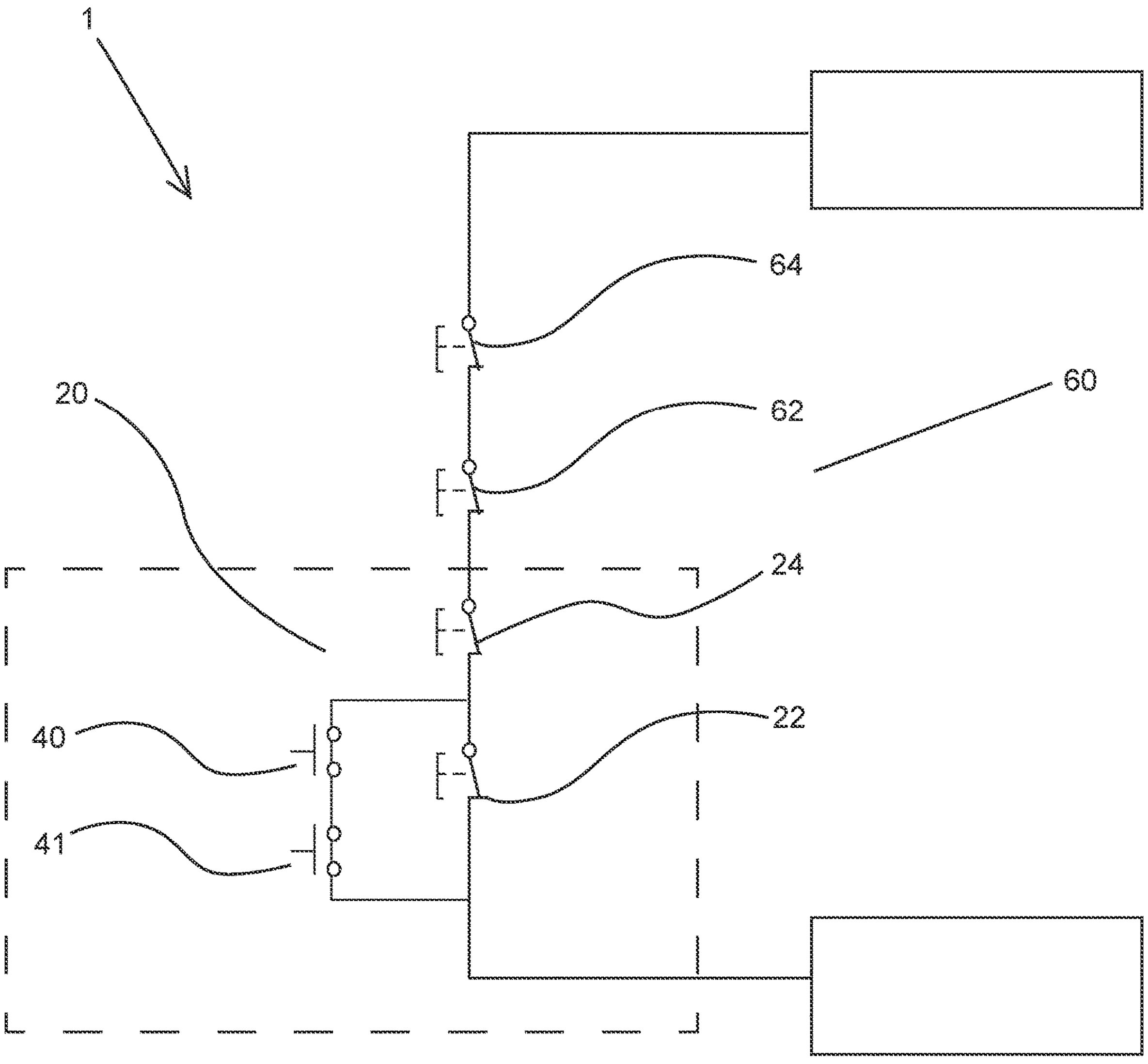
FIG. 2D is a schematic view of a control electrical circuit of an embodiment of an elevator pit safety system.

FIG. 2D shows that in some embodiments, the emergency stop switch 20 may include a plurality of switches. In one embodiment, the plurality of switches includes at least two switches. In another embodiment, the plurality of switches includes at least three switches. The plurality of switches may provide redundancy that contributes to the safety of the elevator pit safety system 1. For example, if the pit 130 is either large or deep (for instance, more than 3 feet deep), then the plurality of switches may help to ensure that at least one switch is always within reach of a person in the pit 130. In some embodiments, the Elevator Code may require that the emergency stop switch 20 include at least two switches.

In some embodiments, the emergency stop switch 20 may include a pit emergency stop switch 22 and an entry emergency stop switch 24. The pit emergency stop switch 22 and the entry emergency stop switch 24 may be wired in series. The pit emergency stop switch 22 and the entry emergency stop switch 24 may each be normally closed switches. The pit emergency stop switch 22 may be located in the pit 130. The entry emergency stop switch may be located proximate to an entry into the pit 130. The entry emergency stop switch may be remote, such as at a video-monitoring station. The entry emergency stop switch 24 may be an auxiliary stop switch such as is required by some elevator codes when the pit-access location is six or more feet above the floor 120 of the pit 130.

For additional safety (as will be appreciated by one of skill in the art), the pit emergency stop switch 22 and the entry emergency stop switch 24 are safety contacts with mechanical latches that only fail—if at all—in the open position. Additionally, they fail self-destructively, so that the switch must be fully replaced if it has been compromised. An example of such a switch is the Safety, Normally Closed Contact and Contact Holder PCW010SS-CH available from Automation Systems Interconnect, Inc.

2. System Operation 2.1 Input States

FIGS. 3A-C show representative state tables for the operation of an elevator pit safety system 1. The emergency stop switch 20 and the power switch 30 may each have an associated input state 200 (for example, as shown in FIG. 3A, input states 220 and 230, respectively). In some embodiments, the one or more override buttons 40, 41 may each have an associated input state 200 (for example, as shown in FIGS. 3B and 3C, input states 240, 241). In some embodiments, the emergency stop switch 20 may be a normally closed switch. In some embodiments, the power switch 30 may be a normally closed switch. In some embodiments, the one or more override buttons 40, 41 may include normally open switches. In various embodiments, any or all switches may comply with safety guidelines (e.g., U.S., Canadian, and E.U. safety guidelines), including safety guidelines for machine safety to include any normally closed switches and any normally open switches.

Embodiments are described above, with reference to FIG. 2D, in which the emergency stop switch 20 comprises a plurality of normally closed switches. In such an embodiment, the emergency stop switch input state 220 is a "closed" state if (and only if) each of the plurality of switches (e.g., the pit emergency stop switch 22 and the entry emergency stop switch 24) are closed. If any of the plurality of switches is open, then the emergency stop switch input state 220 is an "open" state.

2.2 Output States

The lighting system 50, and the stopping component 60 may each have an associated output state 300 (for example, as shown in FIGS. 3A and 3B, output states 350 and 360, respectively). In some embodiments, one or more indicator lights 42, 43 and a beeper 44 may also each have an associated output state 300 (for example, as shown in FIG. 3C, output states 342, 343 and 344, respectively). An output state 300 could be one or more signals, for example a voltage, a current, a duty cycle, or a frequency of electrical oscillation in some embodiments. An output state 300 could be a mechanical state, for example a position, an orientation, a breaking, a contacting, or the state of being open or closed.

2.3 Output Rule

The one or more output states 300 may be determined by the control system 10 according to an output rule 400 (see FIGS. 3A-3C). An output rule 400 may be various types of logic configured to achieve the functionality ascribed to the control system 10 and its resources herein. In some embodiments, the output rule 400 may be implemented in hardware, software, or various combinations thereof. In the embodiment of FIGS. 2A-C, the output rule 400 is implemented in hardware. In other embodiments, an output rule 400 may be implemented in software and stored in memory of the control system 10 (not specifically shown).

2.3.1 Output Rule for Safety

In some embodiments, the output rule 400 may be a correlation of at least one output state 300 with at least one input state 200. For example—with reference to FIG. 3A—an output rule 400 may determine that, if the emergency stop switch input state 220 is an "open" (i.e., activated) state, then the lighting system output state 350 and the stopping component output state 360 are both set to an "on" state. (An "on" state of the stopping component output state 360 may cause the stopping component 60 to stop or substantially prevent the motion or operation of the cab 100.) For another example—again with reference to FIG. 3A—an output rule 400 may determine that, if the power switch input state 230 is a "closed" state, then the lighting system output state 350 and the stopping component output state 360 are both set to an "on" state. Such an output rule 400 may activate both the lighting system 50 and the stopping component 60 when either the emergency stop switch 20 or the power switch 30 are activated.

2.3.2 Output Rule for Override

Other embodiments may include other versions of the output rule 400. For example—with reference to FIG. 3B—an output rule 400 may determine that, while all of the one or more override button input states 240, 241 are a "closed" state, then the stopping component output state 360 is set to an "off" state. Such a rule may allow the stopping component 60 to be temporarily circumvented, for example to adjust the height 102 of the cab 100 above the floor 120.

An output rule 400 may determine that, while any of the override button input states 240, 241 are an "open" state, then the stopping component output state 360 is set to an "on" state. For example, if any override button 40, 41 were to fail or if a person working in the pit 130 were to be knocked away (e.g., by the lowering of the elevator), then the stopping component 60 would stop or substantially prevent the motion or operation of the cab 100. Such an output rule 400 may be implemented in fail-safe circuitry (e.g., to include a force-guided relay) to protect the integrity of the stopping component 60 (e.g., the integrity of a safety string).

The control system 10—and particularly the fail-safe-logic component 14—contribute to the safe implementation of the output rule 400. The fail-safe-logic component 14 includes a force-guided relay (e.g., the SCHRACK Force Guided Relay SR4 D/M available from Tyco Electronics Corporation). The force-guided relay is included in the fail-safe-logic component 14 to monitor the history of the override button input states 240, 241 to require that they cycle completely through "open" and "closed" states before being activated. At least one force-guided relay is coupled to each override button 40, 41. One of skill in the art will appreciate that this prevents compromise of the safety of the override buttons. For example, in the absence of such fail-safe logic, it would be possible to jam one of the override buttons 40 to lock the associated override button input state 240 to be a "closed" state (to allow a user to more conveniently override the stopping component 60 with only a single override button 41).

The fail-safe-logic component 14 includes a timing circuit that monitors the degree of simultaneity of the override button input states 240, 241 being set to be "closed" states. In this way, the output rule 400 can require that the override buttons 40, 41 be depressed within a maximum desired time period (e.g., within 0.5 seconds). One of skill in the art will appreciate that this prevents compromise of the safety of the system.

2.3.3 Output Rule for Override Indicators

Still other embodiments may include other versions of output rule 400. For example—with reference to FIG. 3C—an output rule 400 may determine that, while all of the one or more override button input states 240, 241 are a "closed" state, then the one or more indicator light output states 342, 343 are set to an "on" state. (An "on" state of the one or more indicator light output states 342, 343 may cause the one or more indicator lights 42, 43 to produce a visible alarm, for example a blinking light.) For another example—again with reference to FIG. 3C—an output rule 400 may determine that, while all of the one or more override button input states 240, 241 are a "closed" state, then the beeper output state 344 is set to an "on" state. (An "on" state of the beeper output state 344 may cause the beeper 44 to produce an audible alarm sound.)

2.4 Fail Safe for Override Buttons

In some embodiments, the control system 10 may be configured such that if any override button 40, 41 fails, then the stopping component 60 is activated.

3. Enclosure

Figure 4:
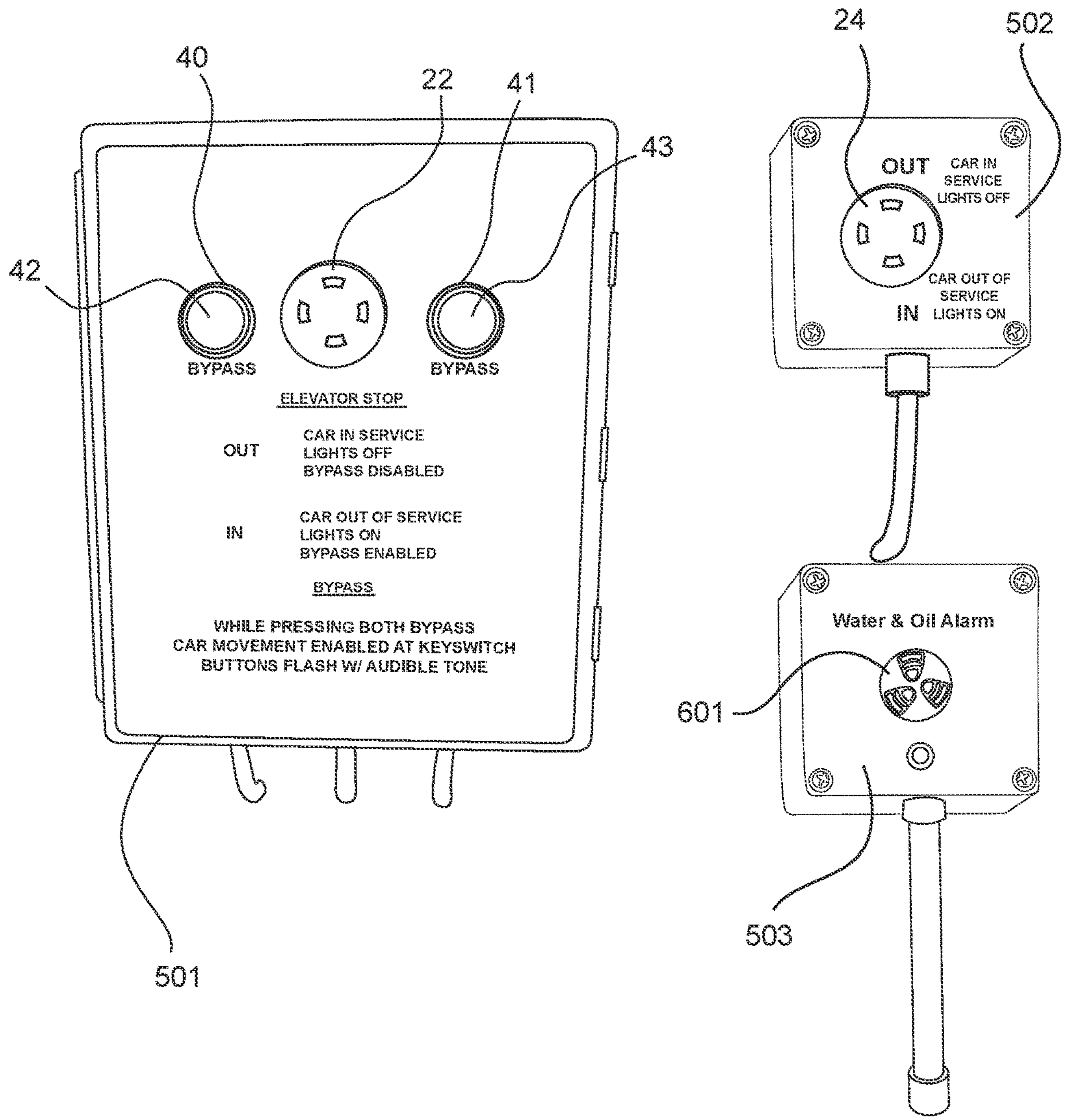
FIG. 4 is a partial view of an embodiment of an elevator pit safety system.

FIG. 4 shows that portions of the elevator safety system 1 may be enclosed in one or more enclosures, e.g. enclosures 501, 502, 503. The enclosures 501, 502, 503 protect the electrical and mechanical components of the elevator safety system 1 from damage, from water, from oil, from dust, from tampering, and/or from accidental contact by users. The enclosures 501, 502, 503 are boxes made of metal or other suitable material that can be opened for maintenance and closed for normal use. The enclosures 501, 502, 503 are electrical-grade enclosures. The enclosures 501, 502, 503 may be powder-coated.

The enclosures 501, 502, 503 shown in FIG. 4 are NEMA 4 enclosures. In other embodiments, the enclosures 501, 502, 503 are NEMA 3R enclosures. "NEMA" is the National Electrical Manufacturers Association. NEMA is an ANSI-accredited Standards Developing Organization. NEMA defines standards for various grades of electrical enclosures. "NEMA 4" means that the enclosure is watertight and excludes at least 65 gallons-per-minute of water from a 1-inch nozzle delivered from a distance not less than 10 feet for 5 minutes. "NEMA 3R" means that the enclosure: is weather-resistant and protects against falling dirt and against weather hazards such as rain, sleet and snow, and is undamaged by the formation of ice. Additional standards are defined in publication ANSI/NEMA 250-2020 titled *Enclosures for Electrical Equipment* (1,000 *Volts Maximum*), the contents of which are incorporated herein by reference entirely.

In FIG. 4, the pit emergency stop switch 22, the override buttons 40, 41 are positioned together on one enclosure 501. The entry emergency stop switch 24 is positioned on a separate second enclosure 502.

4. Water/Oil Alarm

FIG. 4 also shows that connected to the elevator safety system 1 is a water-and-oil alarm 601, which is positioned on enclosure 503. The water-and-oil alarm 601 is in communication with a water-and-oil monitor (not shown in FIG. 4). The water-and-oil monitor is a device that monitors for and detects intrusions of water and/or intrusions of oil into the pit 130. An example of such a water-and-oil monitor is the INTELLIOIL® intelligent oil-sensing control system available from Metropolitan Industries, Inc. The water-and-oil alarm 601 is configured to produce a visible and/or audible alarm when the oil-and-water monitor detects an intrusion of water and/or oil into the pit 130. This contributes to a safe operation of the elevator safety system 1.

5. Handheld Station

Figure 5:
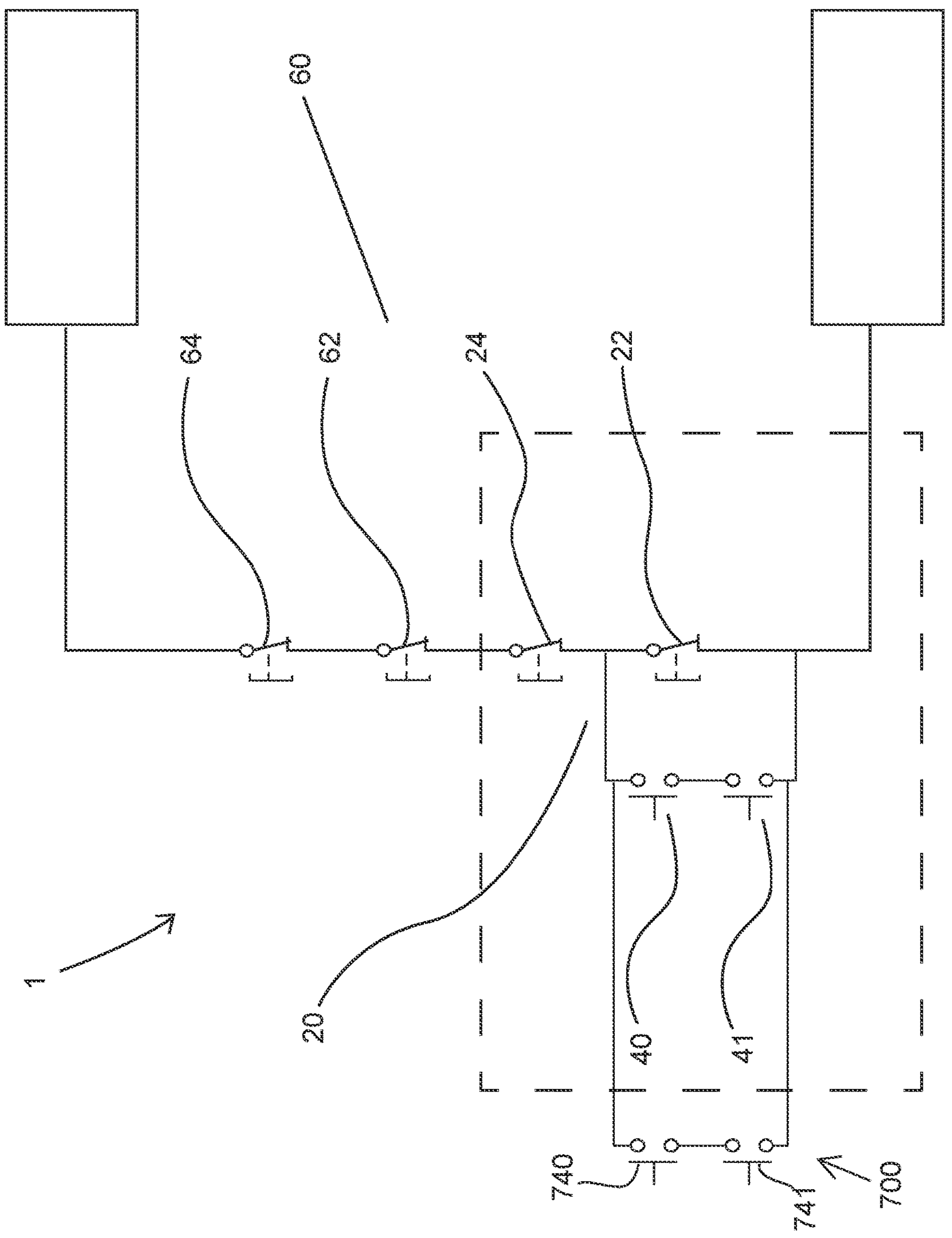
FIG. 5 is a schematic view of a control electrical circuit of an embodiment of an elevator pit safety system.

FIG. 5 is a schematic view of a control electrical circuit of an embodiment of an elevator pit safety system, having a handheld station 700. The handheld station 700 is connected to the control system 10 and has auxiliary override buttons 740, 741. The handheld station 700 is connected to the emergency stop switch 20 by a flexible or wireless connection that allows a user to carry the handheld station 700 around some desired portion of the elevator pit 130 without losing connectivity with the control system 10. The auxiliary override buttons 740, 741 are configured to set the input state 240, 241 of the override buttons 40, 41. This allows operation of the override function of the system by a user that is in the elevator pit 130 but unable to reach the override buttons 40, 41. One of skill in the art will appreciate that this allows the user to more conveniently operate the system's override functionality.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

We claim:

1. An elevator pit safety system comprising:
- a control system;
- an emergency stop switch connected to the control system;
- a power switch connected to the control system and a lighting system;
- a power system comprising a power supply, a battery, and a battery charger and connected to the power switch and the lighting system, wherein the power system is configured to operate even when the power supply fails; and
- one or more override buttons connected to the control system.

2. The elevator pit safety system of claim 1, wherein the emergency stop switch is connected to a stopping component.

3. The elevator pit safety system of claim 2, wherein the stopping component comprises a safety string, a safety brake, a governor, or combination thereof.

4. The elevator pit safety system of claim 1, wherein the control system comprises:
- a control-logic component and
- a fail-safe-logic component.

5. The elevator pit safety system of claim 1, wherein the one or more override buttons are connected to one or more indicator lights.

6. The elevator pit safety system of claim 1, further comprising at least one beeper.

7. The elevator pit safety system of claim 1, wherein the emergency stop switch comprises a pit emergency stop switch and an entry emergency stop switch.

8. An elevator pit safety system comprising:
- a power switch connected both to a control system and to a lighting system, wherein the power switch has an associated power input state, and wherein the lighting system has an associated lighting output state;
- an emergency stop switch connected to the control system, wherein the emergency stop switch has an associated emergency-stop input state;
- a stopping component connected to the control system, wherein the stopping component has an associated stopping output state; and
- one or more override buttons connected to the control system, wherein each of the one or more override buttons has an associated override input state.

9. The elevator pit safety system of claim 8, wherein the control system is configured to determine both the lighting output state and the stopping output state according to an output rule.

10. The elevator pit safety system of claim 9, wherein the output rule comprises at least that the lighting output state and the stopping output state are either both in an "on" state or both in an "off" state, unless all of the one or more override input states are in a "closed" state.

11. The elevator pit safety system of claim 9, further comprising:
- one or more beepers,
  - wherein each of the one or more beepers has an associated beeper output state, and
  - wherein the control system is configured to also determine the beeper output state according to the output rule.

12. The elevator pit safety system of claim 9, further comprising:
- one or more indicator lights,
  - wherein each of the one or more indicator lights has an associated indicator output state, and
  - wherein the control system is configured to also determine the indicator output state according to the output rule.

13. An elevator pit safety system comprising:
- a control system;
- a pit emergency stop switch connected to the control system;
- a power switch connected to the control system;
- one or more override buttons connected to the control system;
- a first enclosure,
  - wherein a portion of the control system is enclosed in the first enclosure and
  - wherein the pit emergency stop switch and override buttons are positioned on the first enclosure; and
  - a handheld station connected to the control system and having one or more auxiliary override buttons.

14. The elevator pit safety system of claim 13, further comprising:
- an entry emergency stop switch connected to the control system; and
- a second enclosure,
  - wherein the entry emergency stop switch is positioned on the second enclosure.

15. The elevator pit safety system of claim 14, further comprising:
- a water-and-oil alarm connected to the control system; and
- a third enclosure,
  - wherein the water-and-oil alarm is positioned on the third enclosure.

* * * * *